United States Patent [19]

Free et al.

[11] 3,960,736

[45] June 1, 1976

[54] SELF-BREAKING VISCOUS AQUEOUS SOLUTIONS AND THE USE THEREOF IN FRACTURING SUBTERRANEAN FORMATIONS

[75] Inventors: Dustin L. Free, Tulsa, Okla.; Karl L. Krumel, Midland, Mich.; Travis C. Snyder, Tulsa, Okla.

[73] Assignee: The Dow Chemical Company, Midland, Mich.

[22] Filed: June 3, 1974

[21] Appl. No.: 475,702

[52] U.S. Cl............................ 252/8.55 R; 166/275; 166/283; 166/308; 252/8.5 C; 252/326
[51] Int. Cl.²........................................ E21B 43/26
[58] Field of Search................ 252/8.55 R, 8.55 C, 252/326, 327; 166/283, 307, 308

[56] References Cited
UNITED STATES PATENTS

| 2,238,671 | 4/1941 | Woodhouse | 252/8.55 |
|---|---|---|---|
| 3,024,191 | 3/1962 | Jones | 252/8.55 |
| 3,634,237 | 1/1972 | Crenshaw et al. | 252/8.55 |
| 3,779,914 | 12/1973 | Nimerick | 252/8.55 |
| 3,828,854 | 8/1974 | Templeton et al. | 166/307 |
| 3,868,998 | 3/1975 | Lybarger et al. | 166/308 X |

*Primary Examiner*—Herbert B. Guynn
*Attorney, Agent, or Firm*—Bruce M. Kanuch

[57] ABSTRACT

Viscous aqueous solutions are prepared which maintain a certain viscosity range over a predetermined period of time (i.e., induction period) and which thereafter break, i.e., decrease in viscosity over a very short period of time. The viscous aqueous solution comprises a polysaccharide having an ability to thicken water and dispersed or dissolved in the aqueous solution an effective quantity of an organic ester which, at a temperature at which it is desired to break the viscous solution, hydrolyzes over a delayed period of time to form an acid which degrades the polysaccharide, thus causing a splitting of the polysaccharide chain and a decrease in the viscosity of the solution.

18 Claims, No Drawings

SELF-BREAKING VISCOUS AQUEOUS SOLUTIONS AND THE USE THEREOF IN FRACTURING SUBTERRANEAN FORMATIONS

BACKGROUND OF THE INVENTION

Viscous aqueous solutions are employed in many processes. For example, they are employed to fracture subterranean formations penetrated by a borehole for increasing the production of petroleum fluids, e.g. crude oil and natural gas. Viscous aqueous solutions are also employed in the secondary recovery of oil from oil bearing subterranean formations by fluid drive processes. Also, various drilling fluids are based upon viscous aqueous liquids.

In all of these processes it is oftentimes desirable to decrease the viscosity of the viscous aqueous solution after a period of time to permit clean up of the formation, disposal of the aqueous solution and the like. Many "breakers" have been developed to cause a degradation of various thickening agents in such processes. However, most of these breakers immediately start to degrade the polymer thereby lowering the efficiency of the process. Therefore, these breakers in many instances can only be employed below critical elevated temperature levels or must be injected in a secondary fluid to contact the viscous fluid in its subterranean location. There is a need for a viscous aqueous system which can be employed at an elevated temperature and which will maintain a certain viscosity range for a certain period of time and then thereafter break to permit easy recovery and clean up of a formation. The present invention concerns such a discovery.

SUMMARY OF THE INVENTION

A viscous aqueous solution is provided comprising a thickening quantity of a polysaccharide and as a breaker an organic ester which hydrolyzes over a certain period of time to release an acid which causes the acid hydrolysis of the polysaccharide with a corresponding splitting of the polysaccharide chain and a decrease in the viscosity of the solution.

The viscous aqueous solution may be employed as a fracturing fluid, as a workover fluid, as a drilling fluid and in other processes where such characteristics are desired.

DETAILED DESCRIPTION OF THE INVENTION

It is known that acetal linkages, i.e. dialkoxy groups attached to the same carbon group, are susceptible to acid hydrolysis and splitting. Polysaccharides, i.e. high molecular weight carbohydrates, contain many acetal linkages. Polysaccharides are sometimes viewed as condensation polymers in which monosaccharides or their derivatives, e.g. uranic acids or amino sugars, have glycosidically joined with the elimination of elements of water. Polysaccharides which may be employed in the practice of the present invention include natural occurring polysaccharides which are dispersible in cold or hot water to produce viscous solutions. Also included are polysaccharides in water soluble or water swellable forms, which are the derivatives or modifications of natural occurring polysaccharides, e.g. celluloses and various gums, which in their natural form are substantially insoluble in water.

One group of polysaccharides which is within the scope of the invention are the industrial gums such as those generally classified as exudate gums, seaweed gums, seed gums, microbial polysaccharides; and hemicelluloses (cell wall polysaccharides found in land plants) other than cellulose and pectins. Included by way of specific example are xylan, mannan, galactan, L-arabino-xylans, L-arabino-D-glucurono-D-xylans; 4O-methyl-D-glucurono-D-xylans; Larabino-(4O-methyl-D-glucurono)-D-xylans; D-gluco-D-mannans; D-galacto-D-mannans and arabino-D-galactans, algin, such as sodium alginate, carrageenin, fucordan, laminaran, agar, gum arabic, gum ghatti, gum karaya, tamarind gum, tragacanth gum, guar gum, locust bean gums and the like. Modified gums such as carboxyalkyl derivatives (e.g. carboxymethyl guar and hydroxyalkyl derivatives, e.g. hydroxypropyl guar) can also be employed. Modified celluloses and starches and derivatives thereof can also be employed. Hereinafter these are referred to as water soluble cellulose and starch. There are literally thousands of such materials which have varying properties that can be employed in the practice of the present invention, for example, cellulose ethers, esters and the like.

In general, any of the water-soluble cellulose ethers can be used in the practice of the invention. Those cellulose ethers which can be used include, among others, the various carboxyalkyl cellulose ethers, e.g. carboxyethyl cellulose and carboxymethyl cellulose (CMC); mixed ethers such as carboxyalkyl ethers, e.g. carboxymethyl hydroxyethyl cellulose (CMHEC); hydroxyalkyl celluloses such as hydroxyethyl cellulose, and hydroxypropyl cellulose; alkylhydroxyalkyl celluloses such as methylhydroxypropyl cellulose; alkyl celluloses such as methyl cellulose, ethyl cellulose and propyl cellulose; alkylcarboxyalkyl celluloses such as ethylcarboxymethyl cellulose; alkylalkyl celluloses such as methylethyl cellulose; and hydroxyalkylalkyl celluloses such as hydroxypropylmethyl cellulose; and the like. Many of the cellulose ethers are commercially available in various grades. The carboxy-substituted cellulose ethers are available as the alkali metal salt, usually the sodium salt. However, the metal is seldom referred to and they are commonly referred to as CMC, CMHEC, etc. For example, water-soluble CMC is available in various degrees of carboxylate substitution ranging from about 0.3 up to the maximum degree of substitution of 3.0. In general, CMC having a degree of substitution in the range of 0.4 to 1.2 is preferred. Frequency, CMC having a degree of substitution in the range of 0.65 to 0.85 is a more preferred cellulose ether. CMC having a degree of substitution less than the above-preferred ranges is usually less uniform in properties and thus less desirable for use in the practice of the invention. CMC having a degree of substitution greater than the above-preferred ranges usually has a lower viscosity and more is required in the practice of the invention. The degree of substitution of CMC is commonly designated in practice as CMC-7, CMC-9, CMC-12, etc., where the 7, 9 and 12 refer to a degree of substitution of 0.7, 0.9 and 1.2, respectively.

Organic ester breakers are employed which, at an elevated temperature, hydrolyze in an aqueous solution to form an acid or acids which in turn cause the hydrolysis and the breaking of the polysaccharide. Esters which may be employed include low molecular weight ($C_1$–$C_{12}$) esters of organic carboxylic acids or mixtures thereof. Both mono and polycarboxylic acid esters can be employed including those which contain chloride substituents which upon hydrolysis form both a carboxylic acid and hydrochloric acid. Dicarboxylic acid esters are found generally to be preferred in the practice of the invention because of their initial slow hydrolysis and accelerated hydrolysis at elevated temperatures of 150°F or higher. Examples of esters which may be employed include methyl formate, ethyl formate, ethylchloro acetate, triethyl phosphate, butyl formate, diethyl oxalate, dimethyl phthalate, dibutyl phthalate, triglycerol acetate, ethyl trifluoro acetate, ethyl trichloro acetate, diethyl maleate, ethyl lactate and diethyl tartrate.

The amount of polysaccharide to be employed in the viscous aqueous solution depends on such factors as the desired maximum viscosity, the intended use of the viscous aqueous solution and the like. For example, if the aqueous solution is to be employed as a fracturing fluid, viscosities ranging from about 20 to about 1000 centipoise measured at 100 RPM on a Fann Model 35 Viscometer at a temperature ranging from about 60° to 200°F are desirable. In flooding techniques aqueous solutions having viscosities ranging from slightly greater than water to about 100 centipoise at 60° to 200°F are desirable, and for drilling fluids viscosities in the range of about 5 to about 1000 centipoise at temperatures ranging from 60° to 200°F are desirable. The exact amount of polysaccharide to be employed will depend on the particular polysaccharide, its ability to increase the viscosity of the fluid, the temperature of the intended use of the fluid and the like. All of these parameters are easily ascertained by simple laboratory experiments and well-known characteristics of the various polysaccharides available on the commercial market. Generally the polysaccharide is employed in an amount ranging from about 10 to about 200 pounds of polysaccharide per 1000 gallons of aqueous solution.

The amount of organic ester breaker to be employed will vary depending on the particular organic ester employed, the temperature of the viscous aqueous solution when it is to be broken, the time delay that is desired and the like.

The organic ester breaker is employed in an amount ranging from about 0.02 to about 2.0 equivalent weights of ester per equivalent weight of the polysaccharide. The equivalent weight of the polysaccharide for the purpose of calculating the amount of breaker to be employed is the molecular weight of the monosaccharide which makes up the polysaccharide molecule. For example, the equivalent weight of guar gum is 162 (i.e., the molecular weight of a single sugar unit). As another example the equivalent weight of hydroxyethyl cellulose (with a hydroxyethyl group molar substitution of 2.5) is 272. The equivalent weight of the ester is the molecular weight of the ester divided by the number of carboxyl groups in the corresponding acid. For example the equivalent weight of diethyl oxalate is 73.

The following examples indicate how these various parameters may effect the breaking time and the degree of breakage of various examples of suitable breakers. For any particular use simple laboratory procedures may be employed to ascertain the breaker-polysaccharide system most desired.

As indicated, the viscous aqueous solution may be employed for various purposes. For example, in fracturing subterranean formations penetrated by a borehole to increase the recovery of petroleum fluids, viscous aqueous solutions are pumped through the borehole at sufficient pressure to cause the formation to fracture. Well-known fracturing techniques and equipment may be employed in the practice of the present invention. The following examples will facilitate a more complete understanding of the practice of the present invention.

EXAMPLE 1

Various viscous aqueous solutions were prepared by mixing a certain breaker and a thickening agent into water using a Waring Blender on low speed for 1 minute. The samples were then placed in a constant temperature bath and the viscosities measured periodically with a Fann Model 35 Viscometer at 100 rpm. In the first series of tests the aqueous solution contained an equivalent of 60 pounds of a fast hydrating hydroxyethyl cellulose per 1000 gallons of water. These tests are reported in the following Table I. In a second series of tests an aqueous solution was prepared containing an equivalent of 60 pounds of a fast hydrating hydroxyethyl cellulose and 40 pounds per 1000 gallons of water of a delayed hydrating glyoxal treated hydroxyethyl cellulose. These tests are reported in the following Table II. In a third series of tests a viscous aqueous solution was prepared containing an equivalent of 60 pounds of the fast hydrating hydroxyethyl cellulose and 90 pounds per 1000 gallons of the delayed hydrating hydroxyethyl cellulose. These tests are reported in the following Table III.

As a comparison hydrazine sulfate was employed to break a viscous fluid prepared as set forth above for the second series of tests. Hydrazine sulfate is a well-known oxidizer breaker for cellulose thickening agents. The results employing hydrazine sulfate are reported in Table IV. A comparison of the results reported in Table II with those of Table IV demonstrate the unique properties of the present invention.

TABLE I

| Temperature (°F) | Breaker | Breaker Concentration (gal/1000 gal) | 100 RPM Fann Viscosities (cps) at Times (hours) of | | | | | |
|---|---|---|---|---|---|---|---|---|
| | | | 1 | 2 | 3 | 24 | 48 | 72 |
| 200 | None | None | 45 | 39 | 36 | 12 | 3 | 6 |
| 200 | Ethyl formate | 1 | 42 | 36 | 33 | 6 | 3 | — |
| 200 | Ethyl formate | 5 | 36 | 21 | 9 | 3 | 3 | — |
| 200 | Ethyl formate | 10 | 39 | 9 | 6 | 3 | 3 | — |
| 175 | None | None | 84 | 75 | 72 | 60 | 51 | 45 |
| 175 | Ethyl chloroacetate | 1 | 78 | 75 | 69 | 21 | 12 | 6 |
| 175 | Ethyl chloroacetate | 5 | 78 | 72 | 69 | 12 | 3 | 3 |
| 175 | Ethyl chloroacetate | 10 | 78 | 72 | 69 | 6 | 3 | 3 |
| 175 | Ethyl formate | 1 | 78 | 72 | 66 | 33 | 15 | 9 |
| 175 | Ethyl formate | 5 | 72 | 72 | 57 | 9 | 3 | 6 |
| 175 | Ethyl formate | 10 | 69 | 63 | 45 | 6 | 3 | 3 |
| 175 | Triethyl phosphate | 1 | 84 | 75 | 72 | 54 | 18 | 9 |
| 175 | Triethyl phosphate | 5 | 81 | 75 | 72 | 54 | 36 | 15 |

TABLE I-continued

| Temperature (°F) | Breaker | Breaker Concentration (gal/1000 gal) | 100 RPM Fann Viscosities (cps) at Times (hours) of ||||||
|---|---|---|---|---|---|---|---|---|
| | | | 1 | 2 | 3 | 24 | 48 | 72 |
| 175 | Triethyl phosphate | 10 | 81 | 72 | 69 | 24 | 9 | 6 |
| 175 | Methyl formate | 1 | 75 | 72 | 63 | 45 | — | — |
| 175 | Methyl formate | 5 | 75 | 69 | 66 | 9 | — | — |
| 175 | Methyl formate | 10 | 72 | 69 | 63 | 6 | — | — |
| 175 | Methyl formate | 1 | 75 | 69 | 69 | 15 | 6 | 6 |
| 175 | Methyl formate | 5 | 69 | 60 | 57 | 9 | 6 | 6 |
| 175 | Methyl formate | 10 | 66 | 60 | 54 | 3 | 6 | 6 |

TABLE II

| Temperature (°F) | Breaker | Breaker Concentration (gal/1000 gal) | 100 RPM Fann Viscosities (cps) at Times (hours) of ||||||
|---|---|---|---|---|---|---|---|---|
| | | | 1 | 2 | 3 | 4 | 24 | 48 | 72 |
| 200 | None | None | 237 | — | — | 204 | 186 | 174 | — |
| 200 | Methyl acetate | 1 | 213 | — | — | 168 | 75 | 27 | — |
| 200 | Methyl acetate | 5 | 189 | — | — | 147 | 60 | 24 | — |
| 200 | Ethyl acetate | 1 | 216 | — | — | 150 | 54 | 24 | — |
| 200 | Ethyl acetate | 5 | 216 | — | — | 162 | 75 | 33 | — |
| 200 | Ethyl salicylate | 5 | 225 | — | — | 198 | 141 | 87 | — |
| 200 | Ethyl salicylate | 10 | 225 | — | — | 204 | 69 | 36 | — |
| 200 | Ethyl propionate | 5 | 216 | — | — | 144 | 69 | 36 | — |
| 200 | Ethyl propionate | 10 | 210 | — | — | 165 | 89 | 39 | — |
| 200 | Methyl laurate | 5 | 207 | — | — | 192 | 180 | 165 | — |
| 200 | n-butyl acetate | 1 | 180 | 174 | — | — | 84 | — | — |
| 200 | n-butyl acetate | 5 | 180 | 171 | — | — | 60 | — | — |
| 200 | sec-butyl acetate | 1 | 192 | — | — | — | 105 | — | — |
| 200 | sec-butyl acetate | 5 | 192 | — | — | — | 90 | — | — |
| 200 | Butyl lactate | 1 | 195 | — | 165 | — | 60 | — | — |
| 200 | Butyl lactate | 5 | 195 | — | 177 | — | 114 | — | — |
| 200 | Methyl formate | 1 | 198 | — | 168 | — | 24 | — | — |
| 200 | Methyl formate | 5 | 186 | — | 96 | — | 33 | — | — |
| 200 | Methyl formate | 10 | 186 | — | 27 | — | 3 | — | — |
| 200 | Ethyl formate | 5 | 219 | — | — | — | 6 | 3 | — |
| 200 | Butyl formate | 1 | 186 | 177 | — | 156 | 63 | 27 | 10 |
| 200 | Butyl formate | 5 | 195 | 186 | — | 144 | 6 | 6 | — |
| 200 | Ethyl chloroacetate | 5 | 225 | — | — | 126 | 3 | 3 | — |
| 200 | Ethyl chloroacetate | 10 | 201 | — | — | 75 | 3 | 3 | — |
| 175 | n-butyl acetate | 1 | 267 | 252 | — | — | 204 | — | — |
| 175 | n-butyl acetate | 5 | 258 | 240 | — | — | 180 | — | — |
| 175 | sec-butyl acetate | 1 | 261 | — | — | — | 231 | — | — |
| 175 | sec-butyl acetate | 5 | 255 | — | — | — | 195 | — | — |
| 175 | Butyl lactate | 1 | 264 | — | 258 | — | 228 | — | — |
| 175 | Butyl lactate | 5 | 264 | — | 252 | — | 237 | — | — |
| 175 | Methyl formate | 1 | 294 | 282 | 279 | — | 165 | — | — |
| 175 | Methyl formate | 5 | 291 | 279 | 273 | — | 72 | — | — |
| 175 | Methyl formate | 10 | 294 | 282 | 270 | — | 21 | — | — |
| 175 | Methyl formate | 1 | 279 | 258 | 252 | — | 126 | 57 | 24 |
| 175 | Methyl formate | 5 | 282 | 258 | 252 | — | 24 | 9 | 6 |
| 175 | Methyl formate | 10 | 282 | 258 | 252 | — | 12 | 6 | 3 |
| 175* | Methyl formate | 5 | — | — | — | — | 15 | 9 | 3 |
| 175* | Methyl formate | 10 | 255 | 240 | 207 | — | 9 | — | — |
| 175 | Ethyl formate | 1 | 285 | 282 | 276 | — | 222 | 141 | 87 |
| 175 | Ethyl formate | 5 | 273 | 264 | 258 | — | 105 | 30 | 12 |
| 175 | Ethyl formate | 10 | 261 | 249 | 246 | — | 51 | 15 | 9 |
| 175 | Butyl formate | 1 | 285 | 270 | — | 252 | 222 | 195 | — |
| 175 | Butyl formate | 5 | 258 | 252 | — | 246 | 126 | 48 | 15 |
| 150 | Ethyl chloroacetate | 1 | 333 | 336 | 336 | — | 315 | — | — |
| 150 | Ethyl chloroacetate | 5 | 333 | 342 | 339 | — | 273 | — | — |
| 150 | Ethyl chloroacetate | 10 | 339 | 345 | 342 | — | 231 | — | — |
| 150 | Ethyl formate | 1 | 366 | 342 | 342 | — | 330 | 297 | 231 |
| 150 | Ethyl formate | 5 | 360 | 342 | 339 | — | 258 | 171 | 99 |
| 150 | Ethyl formate | 10 | 354 | 342 | 336 | — | 257 | 111 | 39 |
| 150 | Triethyl phosphate | 1 | 348 | 336 | 330 | — | 327 | 336 | 330 |
| 150 | Triethyl phosphate | 5 | 342 | 333 | 330 | — | 330 | 339 | 336 |

TABLE II-continued

| Temperature (°F) | Breaker | Breaker Concentration (gal/1000 gal) | 100 RPM Fann Viscosities (cps) at Times (hours) of |  |  |  |  |  |  |
|---|---|---|---|---|---|---|---|---|---|
|  |  |  | 1 | 2 | 3 | 4 | 24 | 48 | 72 |
| 150 | Triethyl phosphate | 10 | 339 | 333 | 330 | — | 320 | 327 | 318 |

*Mix water contained 2% KCl

TABLE III

| Temperature (°F) | Breaker | Breaker Concentration (gal/1000 gal) | 100 RPM Fann Viscosities (cps) at Times (hours) of |  |  |  |  |  |
|---|---|---|---|---|---|---|---|---|
|  |  |  | 1 | 2 | 3 | 24 | 48 | 72 |
| 200 | Methyl formate | 1 | 564 | — | 501 | 60 | 18 | — |
| 200 | Methyl formate | 5 | 555 | — | 327 | 3 | 3 | — |
| 200 | Methyl formate | 10 | 552 | — | 111 | 6 | 3 | — |
| 175 | None | None | 900+ | 900+ | 900+ | 864 | 855 | 885 |
| 175 | Methyl formate | 1 | 711 | 687 | 690 | 483 | 285 | 156 |
| 175 | Methyl formate | 5 | 705 | 705 | 690 | 111 | 27 | 12 |
| 175 | Methyl formate | 10 | 708 | 699 | 681 | 36 | 12 | 6 |
| 175 | Ethyl formate | 1 | 786 | 825 | 822 | 675 | 546 | 240 |
| 175 | Ethyl formate | 5 | 725 | 804 | 789 | 435 | 180 | 27 |
| 175 | Ethyl formate | 10 | 789 | 780 | 744 | 198 | 51 | 15 |
| 175 | Ethyl chloroacetate | 1 | 843 | 831 | 840 | 756 | 708 | 240 |
| 175 | Ethyl chloroacetate | 5 | 849 | 852 | 843 | 652 | 144 | 240 |
| 175 | Ethyl chloroacetate | 10 | 819 | 822 | 819 | 294 | 12 | — |
| 175 | Triethyl phosphate | 1 | 810 | 828 | 810 | 783 | 756 | 741 |
| 175 | Triethyl phosphate | 5 | 900+ | 897 | 882 | 843 | 804 | 573 |
| 175 | Triethyl phosphate | 10 | 807 | 810 | 804 | 780 | 714 | 15 |

TABLE IV

| Temp. (°F) | Hydrazine Sulfate Concentration (lb/1000 gal) | 100 RPM Fann Viscosities (cps) at Times (hours) of |  |  |  |
|---|---|---|---|---|---|
|  |  | 1 | 2 | 18 | 24 |
| 130 | 0 | 330 | — | — | — |
| 130 | 10 | 324 | 303 | 138 | 66 |
| 130 | 20 | 294 | 309 | 171 | 99 |
| 150 | 0 | 305 | — | — | — |
| 150 | 10 | 270 | 189 | 51 | 15 |
| 150 | 20 | 270 | 225 | 45 | 12 |
| 175 | 0 | 270 | — | — | — |
| 175 | 5 | 174 | 117 | 36 | 9 |
| 175 | 10 | 186 | 108 | 21 | 6 |
| 200 | None | 237 | — | — | 186 |
| 200 | 0.5 | 126 | 108 | 54 | 39 |
| 200 | 2 | 111 | 93 | 27 | 9 |

EXAMPLE 2

In this example the effect of various esters on the viscosity of an aqueous solution thickened with an equivalent of 60 pounds of guar gum per 1000 gallons of water at 176°F was determined. The viscosity was determined according to the same procedure described in Example 1. The amount of breaker is expressed as equivalent of ester per equivalent of guar gum. The equivalent weight of guar was taken as 162 (mol. wt. of the single sugar unit). The equivalent weight of the ester was taken as the molecular weight of the ester divided by the number of carboxylic groups in the corresonding acid. The results of these tests are reported in the following Table V.

TABLE V

| Ester | Conc Equiv/ Equiv Guar | Final Solution pH | Viscosity (cps) (160 sec$^{-1}$) at Time (hrs) |  |  |  |  |  |  |  |
|---|---|---|---|---|---|---|---|---|---|---|
|  |  |  | 1 | 2 | 3 | 4 | 7 | 24 | 48 | 72 |
| None | — | 7.4 | 94 | 21 | — | 92 | 88 | 80 | — | 46 |
| Diethyl oxalate | 1.0 | 2.0 | 22 | 5 | — | — | — | — | — | — |
| Dimethyl phthalate | 1.0 | 5.2 | 97 | 96 | — | 96 | 94 | 82 | 48 | 26 |
| Diethyl phthalate | 1.0 | — | 95 | 93 | — | 94 | 91 | 91 | — | 41 |
| Dibutyl phthalate | 1.0 | 7.1 | 94 | 94 | — | 92 | 91 | 84 | — | 55 |
| Triglyceryl acetate | 1.0 | — | 98 | 93 | — | 91 | 87 | 47 | 18 | — |
| Ethyl trifluoro acetate | 0.05 | 6.9 | 103 | — | 93 | — | 92 | 78 | 62 | 48 |
|  | 0.10 | 6.3 | 96 | — | 91 | — | 85 | 61 | 35 | 24 |
| Ethyl trichloro acetate | 0.05 | 7.3 | 98 | — | 89 | — | 87 | 63 | 43 | 32 |
|  | 0.10 | 6.3 | 95 | — | 49 | — | 39 | 18 | 12 | 10 |
| Diethyl maleate | 0.05 | 6.3 | 98 | — | 91 | — | 91 | 91 | 74 | 66 |
|  | 0.10 | 5.2 | 100 | — | 94 | — | 93 | 82 | 61 | 32 |
| Ethyl lactate | 0.05 | 5.5 | 90 | — | 80 | — | 72 | 47 | 31 | 21 |
|  | 0.10 | 4.9 | 99 | — | 96 | — | 92 | 82 | 59 | 39 |
| Diethyl tartrate | 0.05 | 5.6 | 98 | — | 96 | — | 93 | 84 | 69 | 47 |
|  | 0.10 | 4.7 | 95 | — | 92 | — | 89 | 49 | 25 | 14 |

EXAMPLE 3

The effect of different concentrations of breaker on the induction period (period over which viscosity remains within a desired range) and breaking time of a viscous aqueous solution containing an equivalent of 60 pounds of guar gum per 1000 gallons of solution was determined as follows:

Certain amounts of diethyl oxalate were added to different samples of the indicated viscous aqueous solution in a container. The container was then placed in a bath maintained at 176°F, and the viscosity of the viscous solution was determined periodically with a Fann viscometer at 100 rpm. The results of these tests are set forth in the following Table VI.

ing as a breaker diethyloxalate was determined. The tests were conducted at 176°F or 200°F with aqueous solutions which were thickened with 2.88 grams of the gum per 400 ml. of solution. Viscosities were determined periodically with a Fann Viscometer at 100 rpm. The results of the tests are set forth in the following Table VIII.

TABLE VIII

| Test No. | Temp. °F | Thickener | Equiv. Ester/ Equiv. Thickener | CaCO₃ or NaHCO₃ | Final pH | Viscosity (cps) at Time Interval (Hours) | | | | | |
|---|---|---|---|---|---|---|---|---|---|---|---|
| | | | | | | 1 | 2 | 4 | 7 | 24 | 48 |
| 1 | 176 | HEC | 0.1 | CaCO₃⁽¹⁾ | 7.5 | 60.6 | 59.4 | 55.8 | 50.4 | 28.8 | 14.4 |
| 2 | 176 | HEC | 0.2 | " | 7.2 | 61.2 | 58.1 | 55.8 | 52.8 | 26.4 | 12.0 |
| 3 | 176 | HEC | 0.5 | " | 7.0 | 59.4 | 60.0 | 51.6 | 56.4 | 38.4 | 21.6 |
| 4 | 200 | HEC | 0.1 | " | 7.2 | 38.4 | 37.2 | 32.4 | 25.2 | 8.4 | — |
| 5 | 200 | HEC | 0.2 | " | 7.5 | 40.8 | 39.6 | 34.2 | 27.6 | 9.0 | 5.4 |
| 6 | 200 | HEC | 0.5 | " | 7.2 | 41.4 | 40.8 | 36.6 | 30.6 | 13.7 | 9.6 |
| 7 | 176 | Guar | 0.5 | NaHCO₃⁽²⁾ | 8.2 | 91.2 | 89.5 | 86.4 | 84.0 | 69.0 | 46.2 |
| 8 | 176 | Guar | 0.5 | " | 8.0 | 94.2 | 90.0 | 85.2 | 81.0 | 47.4 | 13.8 |
| 9 | 176 | Guar | 0.1 | CaCO₃ | 7.5 | 96.0 | 94.8 | 94.8 | 91.8 | 72.0 | 50.4 |
| 10 | 176 | Guar | 0.1 | CaCO₃ | 7.5 | 93.0 | 91.2 | 90.0 | 88.2 | 81.6 | 73.2 |

⁽¹⁾1 Gram of CaCO₃ was employed in Test Nos. 1–6 and 9–10.
⁽²⁾0.288 Gram of NaHCO₃ was employed in Test No. 7 and 0.72 gram in Test No. 8.

This data and Test No. 3 of Example 4 clearly demonstrate the adverse effect of neutralizing ions on the breaking ability of esters. Because of this the behavior of the system is unpredictable in acid soluble forma-

TABLE VI

| Test No. | Equiv. Ester/ Equiv. Guar | Final pH | Viscosity (cps) at Time Interval (Hours) | | | | | | | |
|---|---|---|---|---|---|---|---|---|---|---|
| | | | 1 | 2 | 4 | 7 | 7.5 | 8 | 24 | 48 |
| 1 | No breaker | | 94.2 | 90.5 | 91.8 | — | — | 88.2 | 79.7 | — |
| 2 | 1.0 | 2 | 21.6 | 4.8 | — | — | — | — | — | — |
| 3 | 0.5 | 2.3 | 66.0 | 15.0 | 4.8 | — | — | — | — | — |
| 4 | 0.2 | 2.6 | 87.0 | 58.2 | 20.2 | 5.4 | — | — | — | — |
| 5 | 0.1 | 3.1 | 93.6 | 84.7 | 60.6 | 27.0 | — | — | 4.2 | — |
| 6 | 0.05 | 3.5 | 96.5 | 89.4 | 82.3 | — | 64.8 | — | 19.4 | 6.6 |

EXAMPLE 4

The effect of various quantities of diethyloxalate on the induction and breaking time for an aqueous solution thickened with a fast hydrating hydroxyethyl cellulose at a fluid temperature of 176°F was determined. The thickened solution was prepared from an aqueous solution having an initial pH of 5.8. The cellulose was employed in an amount equal to 2.88 gms per 400 ml of water. The viscosities were determined with a Fann Viscometer at 100 rpm. The results of these tests are reported in the following Table VII.

tions, e.g., limestone, etc., and therefore it is preferred to employ the viscous aqueous solution of the present invention in the treatment, e.g., fracturing, flooding, etc., of formations which contain substantially no acid soluble minerals. The viscous aqueous solution can be successfully employed to treat sandstone and other similar siliceous formations.

What is claimed is:

1. A viscous aqueous well treating composition which has a certain viscosity for a predetermined period of time at a certain temperature and which subsequently breaks to form a lower viscosity fluid within a short period of time, which comprises:

a viscous aqueous solution containing a sufficient quantity of a polysaccharide-thickening agent, containing acetal linkages and which, in an aqueous solution is degraded by an acid to provide a solu-

TABLE VII

| Test⁽¹⁾ No. | Equiv. Ester/ Equiv. Cellulose | Final pH | Viscosity (cps) at Time Interval (Hours) | | | | | | |
|---|---|---|---|---|---|---|---|---|---|
| | | | 1 | 2 | 4 | 7 | 24 | 57 | 72 |
| 1 | 0.2 | 3.1 | 90.5 | 72.0 | 41.4 | 15.0 | 4.8 | — | — |
| 2 | 0.1 | 3.4 | 93.0 | 75.0 | 56.4 | 36.0 | 7.2 | — | — |
| 3⁽²⁾ | 0.1 | 7.6 | 90.0 | 72.6 | 68.5 | 69.6 | 54.6 | 36.6 | 27.0 |
| 4 | 0.1 | 3.3 | 85.8 | 66.0 | 50.4 | 29.4 | 4.8 | — | — |
| 5 | 0.05 | 3.9 | 85.8 | 73.8 | 67.8 | 63.6 | 44.4 | 20.4 | 10.2 |

⁽¹⁾In Test Nos. 1, 2, 3 and 5 0.15 ml of a surfactant was added to the solution to help disperse organic ester in the water. In Test No. 4, no surfactant was added.
⁽²⁾Solution also contained 1 gram of CaCO₃ to simulate a carbonaceous formation.

EXAMPLE 5

In this example the effect of CaCO₃ and NaHCO₃ on the breaking of aqueous solutions thickened with hydroxyethyl cellulose (HEC) or guar gum and containtion having a desired viscosity at the temperature of use and an effective quantity of a $C_1 - C_{12}$ organic ester of a carboxylic acid, which hydrolyzes in said aqueous solution at said temperature of use to produce an acid which degrades the polysaccharide and causes the viscosity of the aqueous composition to be lowered to a desired lower level.

2. The composition of claim 1 wherein the organic ester consists of a dicarboxylic acid ester which has an accelerated rate of hydrolysis at an elevated temperature of at least about 150°F.

3. The composition of claim 1 wherein the polysaccharide is a cellulose ether.

4. The composition of claim 3 wherein the organic ester consists of a dicarboxylic acid ester.

5. The composition of claim 4 wherein the organic ester is present in the composition in an amount ranging from about 0.02 to about 2.0 equivalent weight of said organic ester per equivalent weight of said polysaccharide.

6. The composition of claim 1 wherein a sufficient quantity of polysaccharide is present to provide a viscous aqueous composition having a viscosity ranging from about 20 to about 1000 centipoise at a temperature ranging from about 60° to about 200°F.

7. The composition of claim 6 wherein the polysaccharide is a cellulose ether.

8. The composition of claim 7 wherein the organic ester is a dicarboxylic acid ester.

9. The composition of claim 8 wherein the organic ester is present in said composition in an amount ranging from about 0.02 to about 2.0 equivalent weights of said organic ester per equivalent weight of said polysaccharide.

10. A method of fracturing a subterranean formation penetrated by a borehole, said formation being substantially free of acid soluble minerals which comprises:
    injecting through said borehole and in contact with said formation the composition of claim 1 at a sufficient pressure to fracture said formation.

11. The method of claim 10 wherein the organic ester consists of a dicarboxylic acid ester which has an accelerated rate of hydrolysis at an elevated temperature of at least about 150°F.

12. The method of claim 10 wherein the polysaccharide is a cellulose ether.

13. The method of claim 12 wherein the organic ester consists of a dicarboxylic acid ester.

14. The method of claim 13 wherein the organic ester is present in the composition in an amount ranging from about 0.02 to about 2.0 equivalent weight of said organic ester per equivalent weight of said polysaccharide.

15. The method of claim 10 wherein a sufficient quantity of polysaccharide is present to provide a viscous aqueous composition having a viscosity ranging from about 20 to about 1000 centipoise at a temperature ranging from about 60° to about 200°F.

16. The method of claim 15 wherein the polysaccharide is a cellulose ether.

17. The method of claim 16 wherein the organic ester is a dicarboxylic acid ester.

18. The method of claim 17 wherein the organic ester is present in said composition in an amount ranging from about 0.02 to about 2.0 equivalent weights of said organic ester per equivalent weight of said polysaccharide.

* * * * *

UNITED STATES PATENT OFFICE
CERTIFICATE OF CORRECTION

PATENT NO. : 3,960,736
DATED : June 1, 1976
INVENTOR(S) : Dustin L. Free, Karl L. Krumel, Travis C. Snyder It is certified that error appears in the above-identified patent and that said Letters Patent are hereby corrected as shown below:

Column 2, line 6, both occurrences, change "40" to --4-0--.

Column 2, line 27, after "carboxyalkyl" insert

-- hydroxyalkyl--.

*Signed and Sealed this*

Twenty-first Day of September 1976

[SEAL]

*Attest:*

RUTH C. MASON
*Attesting Officer*

C. MARSHALL DANN
*Commissioner of Patents and Trademarks*